US011695641B2

(12) United States Patent
Bar Oz et al.

(10) Patent No.: US 11,695,641 B2
(45) Date of Patent: *Jul. 4, 2023

(54) IMPLEMENTATION OF A MOCK SERVER FOR DISCOVERY APPLICATIONS

(71) Applicant: ServiceNow, Inc., Santa Clara, CA (US)

(72) Inventors: Tom Bar Oz, Petah Tikva (IL); Robert Bitterfeld, Petah Tikva (IL); Venkatesh Ainalli, Bangalore (IN); Aviya Aron, Petah Tikva (IL); Naveen Kumar HR, Bangalore (IN)

(73) Assignee: ServiceNow, Inc., Santa Clara, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/567,772

(22) Filed: Jan. 3, 2022

(65) Prior Publication Data
US 2022/0123999 A1    Apr. 21, 2022

Related U.S. Application Data

(63) Continuation of application No. 17/024,502, filed on Sep. 17, 2020, now Pat. No. 11,245,591.

(51) Int. Cl.
*H04L 67/51*    (2022.01)
*H04L 43/50*    (2022.01)
(Continued)

(52) U.S. Cl.
CPC ............ *H04L 41/12* (2013.01); *H04L 9/3236* (2013.01); *H04L 41/0213* (2013.01); *H04L 43/50* (2013.01); *H04L 67/133* (2022.05)

(58) Field of Classification Search
CPC ....... H04L 41/12; H04L 9/3236; H04L 43/50; H04L 67/40; H04L 41/0213
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

*Primary Examiner* — Aftab N. Khan
(74) *Attorney, Agent, or Firm* — McDonnell Boehnen Hulbert & Berghoff LLP

(57) ABSTRACT

A mock server implementation for discovery applications is provided. A computing system includes a mock server, which receives a client request from a mock client on a discovery server. The client request corresponds to a user query associated with a discovery of resources on a remote computing system. The mock server determines a first response from a mock response dataset. The first response to the client request is determined based on the received client request. The mock response dataset includes a set of responses associated with a sequence of operations executed in the past for the discovery of resources on the remote computing system. The mock server transmits the determined first response to the mock client on the discovery server. The mock client receives the transmitted first response and sends the received first response to a discovery application interface on a user device.

19 Claims, 7 Drawing Sheets

(51) Int. Cl.
*H04L 41/12* (2022.01)
*H04L 41/0213* (2022.01)
*H04L 9/32* (2006.01)
*H04L 67/133* (2022.01)

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A * | 11/1999 | Bonnell ............... G06F 9/50 710/5 |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 * | 5/2004 | Bowman-Amuah ..... G06F 8/20 718/100 |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Frinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,089,219 B1 * | 10/2018 | Bates ................... H04L 41/145 |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0010661 A1 * | 1/2005 | Southam ............... H04L 67/563 709/224 |
| 2005/0015217 A1 | 1/2005 | Weidl et al. |
| 2005/0021276 A1 * | 1/2005 | Southam ................ H04L 43/50 702/122 |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0088405 A1 * | 4/2010 | Huang .................... H04L 47/10 709/224 |
| 2010/0110932 A1 | 5/2010 | Doran et al. |
| 2018/0123940 A1 | 5/2018 | Rimar et al. |
| 2019/0104398 A1 | 4/2019 | Owen et al. |
| 2020/0050689 A1 | 2/2020 | Tal et al. |
| 2020/0204443 A1 | 6/2020 | Bar Oz et al. |
| 2020/0233786 A1 * | 7/2020 | Battaglia ............ G06F 11/3664 |
| 2021/0042210 A1 * | 2/2021 | Chang ................ G06F 11/3664 |
| 2021/0194764 A1 * | 6/2021 | Badyan ................ G06F 9/5077 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

IMPLEMENTATION OF A MOCK SERVER FOR DISCOVERY APPLICATIONS

CROSS-REFERENCE TO RELATED APPLICATION

This application is a continuation of and claims priority to U.S. patent application Ser. No. 17/024,502, filed Sep. 17, 2020, which is hereby incorporated by reference in its entirety.

FIELD

Various embodiments of the disclosure relate to resource discovery. More specifically, various embodiments of the disclosure relate to a system and method for implementing a mock server for discovery applications.

BACKGROUND

Advancement in resource discovery have allowed organizations and individuals to use applications for discovery of various disparate resources of a remote computing environment. Such resources may include hardware resources (such as computing devices, network switches, storage devices) and software resources (such as database applications or microservices). Typically, the remote computing environment provides a mechanism through which its resources can be discovered. For example, such a mechanism may include Representational State Transfer function (REST) calls, HTTP GET/POST requests, Simple Object Access Protocol (SOAP) requests, or other methods to invoke functions on the remote computing environment.

In a typical software development or testing process, the remote computing environment may not be available or suitable for testing use. This may affect the software testing or development process.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for implementation of a mock server for discovery applications is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
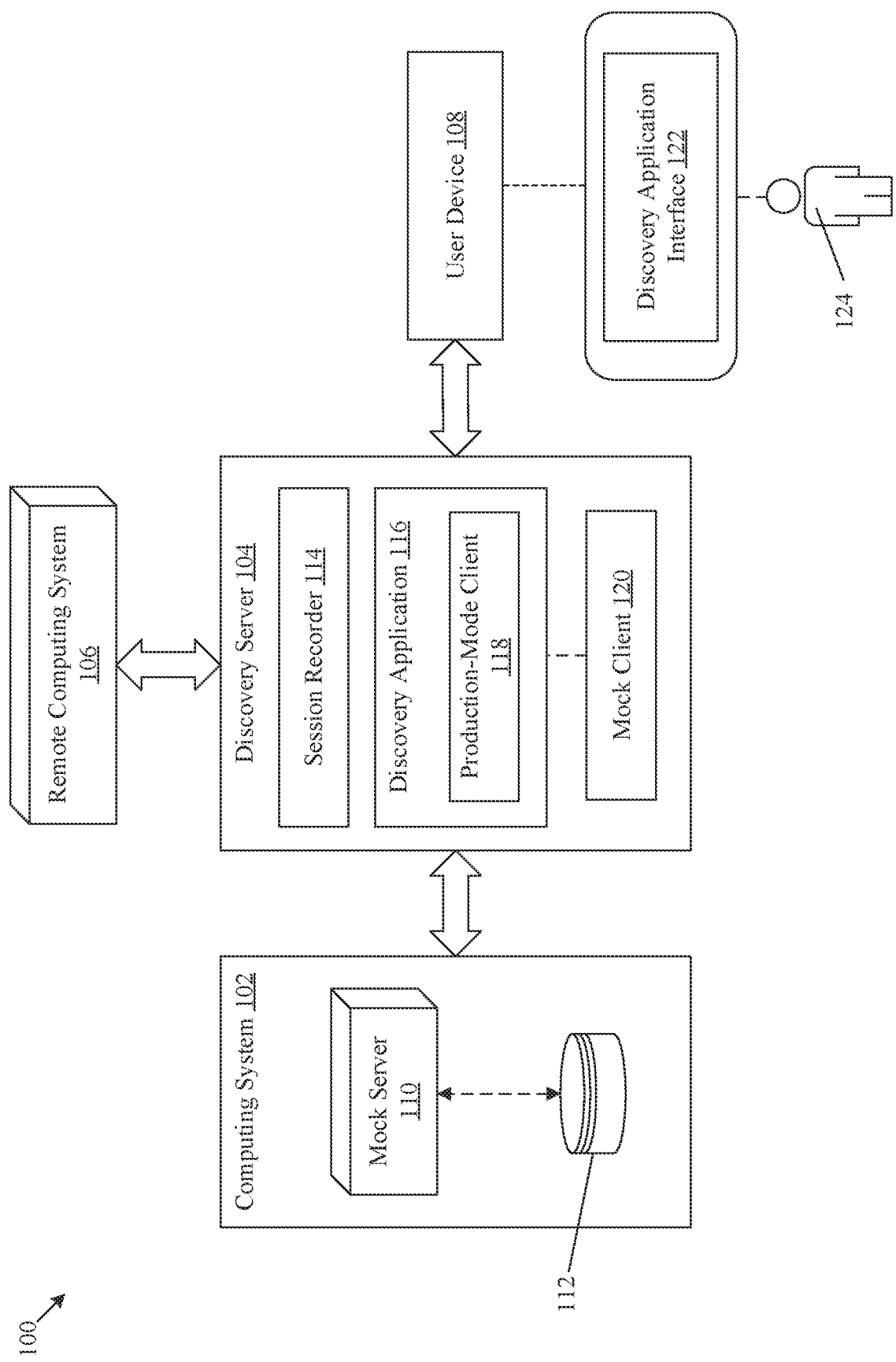
FIG. 1 is a diagram of an exemplary network environment for implementation of a mock server for discovery applications, in accordance with an embodiment of the disclosure.

The following described implementations may be found in the disclosed system and method for implementing a mock server for a discovery application. The discovery application may be hosted on a discovery server and may be configured to discover resources of a remote computing system. Examples of the resources may include, but are not limited to, virtual computing devices, load balancers, and storage volumes, application services or microservices that may be distributed across one or more availability zones (e.g., datacenters) and within one or more geographic regions. To discover the resources on the remote computing system, the discovery application may be configured to send client requests to external Application Programming Interfaces (APIs) components of the remote computing system to determine a presence, status, and attributes of each resource in different regions and availability zones. The mock server may be implemented to simulate such external API components.

In mock testing, the remote computing system may not be available to respond to the client requests (as part of a discovery pattern) from the discovery server. Thus, the discovery server may implement a mock client, which may route the client requests to the mock server, which may respond to the client requests in a way that simulates an actual API service of the remote computing system. The mock server may be hosted on an instance (such as Software-as-a-Service (SaaS) instance), which may allow the mock server to respond to client requests with Representational State Transfer (REST) responses. In some instances, the mock server may be used for running scale tests and/or integration tests on the discovery application and/or the remote computing system.

The mock server may maintain a mock response dataset based on which the mock server may respond to the client requests. The mock response dataset may include several records of requests and responses associated with execution of a sequence of operations (of a discovery pattern) in the past for a discovery of resources on the remote computing system. The discovery server may implement a session recorder, which may record such requests and responses. The session recorder may also support session recording for every discovery protocol and may be responsible for populating the mock response dataset.

Exemplary aspects of the disclosure provide a computing system that may include the mock server. The mock server may receive a client request from the mock client on the discovery server. The client request may correspond to a user query associated with the discovery of the resources on the remote computing system. A discovery application interface on a user device may be configured to send the user query to the mock client based on an input from a user of the user device. Based on the received client request, the mock server may determine a first response from a mock response dataset. The mock response dataset may include a set of responses associated with a sequence of operations executed in the past for the discovery of the resources on the remote computing system. The mock response dataset may include a set of records, each of which may include a request that may be associated with one of the sequence of operations, a response that may be paired with the request, and a hash key that may uniquely identify the request and response. The mock server may transmit the determined first response to the mock client on the discovery server. The mock client may receive the transmitted first response and may send the received first response to a discovery application interface on the user device.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized, and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

FIG. 1 is a diagram of an exemplary network environment for implementation of a mock server for discovery applications, in accordance with an embodiment of the disclosure. With reference to FIG. 1, there is shown a block diagram of a network environment 100. The network environment 100 may include a computing system 102, a discovery server 104, a remote computing system 106, and a user device 108. The computing system 102 may include a mock server 110 and a database 112 associated with the mock server 110. The discovery server 104 may include a session recorder 114 and a discovery application 116. The discovery application 116 may include a production-mode client 118 and a mock client 120. The user device 108 may host a discovery application interface 122, through which a user 124 may provide inputs to the discovery server 104. The user 124 may be an Information Technology (IT) administrator or a power user who may be tasked with monitoring, management, or administration of the remote computing system 106. The computing system 102 may be configured to communicate with the discovery server 104, the remote computing system 106, and the user device 108, through a common communication network or through separate communication networks.

The computing system 102 may include suitable logic, circuitry, code, and/or interfaces that may be configured to host the mock server 110 and maintain the database 112 for the mock server 110. For example, the computing system 102 may store a mock response dataset in the database 112. The mock response dataset may include a set of responses associated with a sequence of operations (referred to as a discovery pattern) executed in the past for discovery of resources on the remote computing system 106. Example implementations of the computing system 102 may include, but are not limited to, an application server, a database server, a mainframe server, a cloud server (e.g., a hybrid, a private, or a public cloud), or a web server.

The discovery server 104 may include suitable logic, circuitry, code, and/or interfaces that may be configured to execute operations associated with a discovery of resources associated with the remote computing system 106. The discovery server 104 may host the session recorder 114, the discovery application 116, the production-mode client 118, and the mock client 120. Operations of the session recorder 114, the discovery application 116, the production-mode client 118, and the mock client 120 may be executed on the discovery server 104. Examples of the discovery server 104 may include, but are not limited to, an application server, a cloud server, a mainframe server, a database server, a web server, or other type of servers.

In FIG. 1, the discovery server 104 is shown as a separate entity from the computing system 102. However, the scope of the disclosure may not be so limiting and in some embodiments, the entire functionality of the discovery server 104 may be incorporated in the computing system 102 (as shown for example, in FIG. 2), without a deviation from the scope of the disclosure.

The remote computing system 106 may include suitable logic, circuitry, code, and/or interfaces that may be configured to manage resources, which may be homogenous or disparate software and/or hardware resources available on the remote computing system 106. As one example, such resources may include, virtual computing devices, load balancers, network devices, storage volumes that may be distributed across one or more availability zones (e.g., datacenters) and within one or more geographic regions, and the like. As another example, such resources may include services or microservices of an application deployed on the remote computing system 106, virtual machine (VM) resources, hosts, clusters, cluster nodes, and the like.

In an embodiment, the remote computing system 106 may be a cloud computing environment that may be configured to host software applications (such as Software-as-a-Service application), provision data storage and retrieval, and host different web-based software services and/or micro-services that may be exposed through Application Programming Interfaces (APIs).

The user device 108 may include suitable logic, circuitry, code, and/or interfaces that may be configured to host a discovery application interface 122 associated with the discovery application 116 on the discovery server 104. Through the discovery application interface 122, the user 124 may be able to provide a user query associated with the discovery of resources on the remote computing system 106. For example, the discovery application interface 122 may be a Graphical User Interface (GUI), loaded on a web client (such as a web browser) of the user device 108. The user device 108 may also display a response to the user query on the discovery application interface 122. Examples of the user device 108 may include, but are not limited to, a workstation, a laptop, a tablet, an internet-enabled device, a desktop computer, or any portable or non-portable device with a networking and display capability.

The mock server 110 may include suitable logic, circuitry, code, and/or interfaces that may be configured to respond to client requests from the mock client 120 with mock responses. Such requests may correspond to a user query associated with the discovery of resources on the remote computing system 106. The mock responses of the mock server 110 may emulate responses of a real server (i.e. the remote computing system 106). The user 124 may not be able to distinguish the mock responses from the responses of the real server.

In an embodiment, the mock server 110 may be deployed through a software plugin on an instance (such as a Glide instance) running on the computing system 102. Examples of the mock server 110 may include, but are not limited to, an application server, a cloud server, a mainframe server, a database server, a web server, or other type of servers.

The database 112 may include suitable logic, code, and/or interfaces that may be configured to store the mock response dataset. The session recorder 114 may populate the mock response dataset based on session data associated with an execution of the sequence of operations in the past for the discovery of the resources on the remote computing system 106. The sequence of operations may also be referred to as a discovery pattern, which when executed on the discovery server 104, may allow the discovery application 116 to find and collect information associated with the resources of the remote computing system 106. The collected information may be parsed and formatted to populate configuration items (CIs, as defined by Information Technology Infrastructure Library (ITIL)) associated with such resources in a Configuration Management Database (CMDB, as defined by ITIL) on the discovery server 104.

The session recorder 114 may include suitable logic, code, and/or interfaces that may be configured to record session data associated with the discovery of the resources on the remote computing system 106 and populate the mock response dataset in the database 112 based on the recorded session data. The session data may include, for example, requests transmitted to the remote computing system 106 and responses of the remote computing system 106 to the requests. In an embodiment, the session recorder 114 may be implemented as an application or a script that may make Representation State Transfer (REST) calls to a scriptable REST endpoint to populate the mock response dataset.

The session recorder 114 may support all available communication protocols (such as Representational state transfer (REST), Secure Shell (SSH), Simple Network Management Protocol (SNMP), or Windows Management Instrumentation (WMI)) for the discovery. The session recorder 114 may not affect the execution of the sequence of operations (i.e. the execution of the discovery pattern) even if session recording fails. By default, the session recorder may be deactivated. The session recorder may be activated by updating a specific property of the discovery server 104.

The discovery application 116 may include suitable logic, code, and/or interfaces that may be configured to discover the resources on the remote computing system 106. The discovery of the resources may include a determination of a presence, status, and attributes of each resource in different regions and availability zones based on APIs exposed by the remote computing system 106. The discovery application 116 may be configured to execute the sequence of operations for the discovery of the resources on the remote computing system 106. The discovery application 116 may include a shell client, which may support a production mode and a test mode (or a mock mode). In the production mode, the shell client may inherit production-mode classes. Whereas, in the mock mode, the shell client may inherit mock classes. Herein, a class may represent a data type, which may hold its own data members and functions associated with one of: the production mode or the test mode. When the shell client inherits the production mode classes, the production-mode client 118 may be activated. Similarly, when the shell client inherits the mock classes, the mock client 120 may be activated. The interface of both the production-mode client 118 and the mock client 120 may remain same.

The production-mode client 118 may include suitable logic, code, and/or interfaces that may be configured to implement the production-mode classes to send requests (associated with the discovery pattern) to a real server (such as the remote computing system 106). The production-mode client 118 may be activated when the discovery pattern is executed at runtime for discovery of resources on the real server. By using functions and data members of the production-mode classes, the production-mode client 118 may create and send such requests for the discovery of resources on the real server.

The mock client 120 may include suitable logic, circuitry, code, and/or interfaces that may be configured to emulate a functionality of the production-mode client 118 to communicate with the mock server 110, instead of the real server. Similar to the production-mode client 118, the mock client 120 may receive a user query from the user device 108 and may transmit a client request to the mock server 110 to retrieve information associated with resource(s) indicated in the received user query. Such information may include a response of the mock server 110 to the client request. Instead of sending requests to the real server, the mock client 120 may implement functions and data members of the mock classes to generate and transmit the client request to the mock server 110.

Similar to the session recorder 114, the mock client 120 may also support all available communication protocols (such as REST, SSH, SNMP, or WMI) for the discovery. Thus, the mock client 120 may configured to respond to the user query in a format compatible with a protocol specified in the user query or query parameters associated with the user query.

The discovery application interface 122 may include suitable logic, code, and/or interfaces that may be configured to display a user-editable option (such as a query form) to allow the user 124 to compose the user query. The discovery application interface 122 may receive a user input through an input/output (I/O) device (not shown in FIG. 1). The user input may include a user query and query parameters associated with the user query. The user 124 may input the user query and the query parameters through the user-editable option. The user query and the query parameters may be transmitted to the mock client 120 on the discovery server 104. The mock client 120 may respond to the user query with a response that may be received and rendered on the discovery application interface 122.

In operation, the mock server 110 of the computing system 102 may receive a client request from the mock client 120 on the discovery server 104. The client query may correspond to a user query associated with a discovery of resources on the remote computing system 106. The mock server 110 may determine a first response from the mock response dataset (stored on the database 112) based on the received client request. The mock response dataset may include a set of responses associated with a sequence of operations executed in the past for the discovery of resources on the remote computing system 106. An example implementation of the mock response dataset as a mock response table is provided in FIG. 3, for example.

In an embodiment, the mock client 120 may receive the user query and the query parameters associated with the user query from the discovery application interface 122. The mock client 120 may generate a hash key based on the user query and the query parameters. Further, the mock client 120 may include the generated hash key in the client request that the mock client 120 may transmit to the mock server 110. The mock server 110 may retrieve the generated hash key from the client request and may determine the first response from the mock response based on the retrieved hash key. For example, the mock server 110 may pick up the hash key from the client request and search the mock response dataset for a record which includes a preset hash key. If the preset hash key matches the hash key from the client request, then the mock server 110 may select the first response from such record.

The mock server 110 may transmit the determined first response to the mock client 120, which may receive the transmitted first response from the mock server 110. In some embodiments, the mock server 110 may be implemented on top of a glide.js instance. The glide.js instance may implement a REST service using which the mock server 110 may be configured to transmit the first response (i.e. mock response) as a REST response to the mock client 120.

The mock client 120 may send the first response to the discovery application interface 122 on the user device 108. The discovery application interface 122 may render the first response in a suitable format on the user device 108. In an embodiment, the mock client 120 may determine a communication protocol associated with the user query and may transform the first response based on the determined communication protocol. Examples of the communication protocol may include, but are not limited to, a REST protocol, a WMI protocol, an SSH protocol, or an SNMP protocol. The mock client 120 may send the transformed first response to the discovery application interface 122 on the user device 108. As the mock client 120 transforms the first response to a format associated with the determined communication protocol, it may not matter if responses in the mock response dataset are recorded in a format associated with a different communication protocol. Details associated with operations of the mock client 120 and the mock server 110 are provided, for example, in FIGS. 3 and 4.

Figure 2:
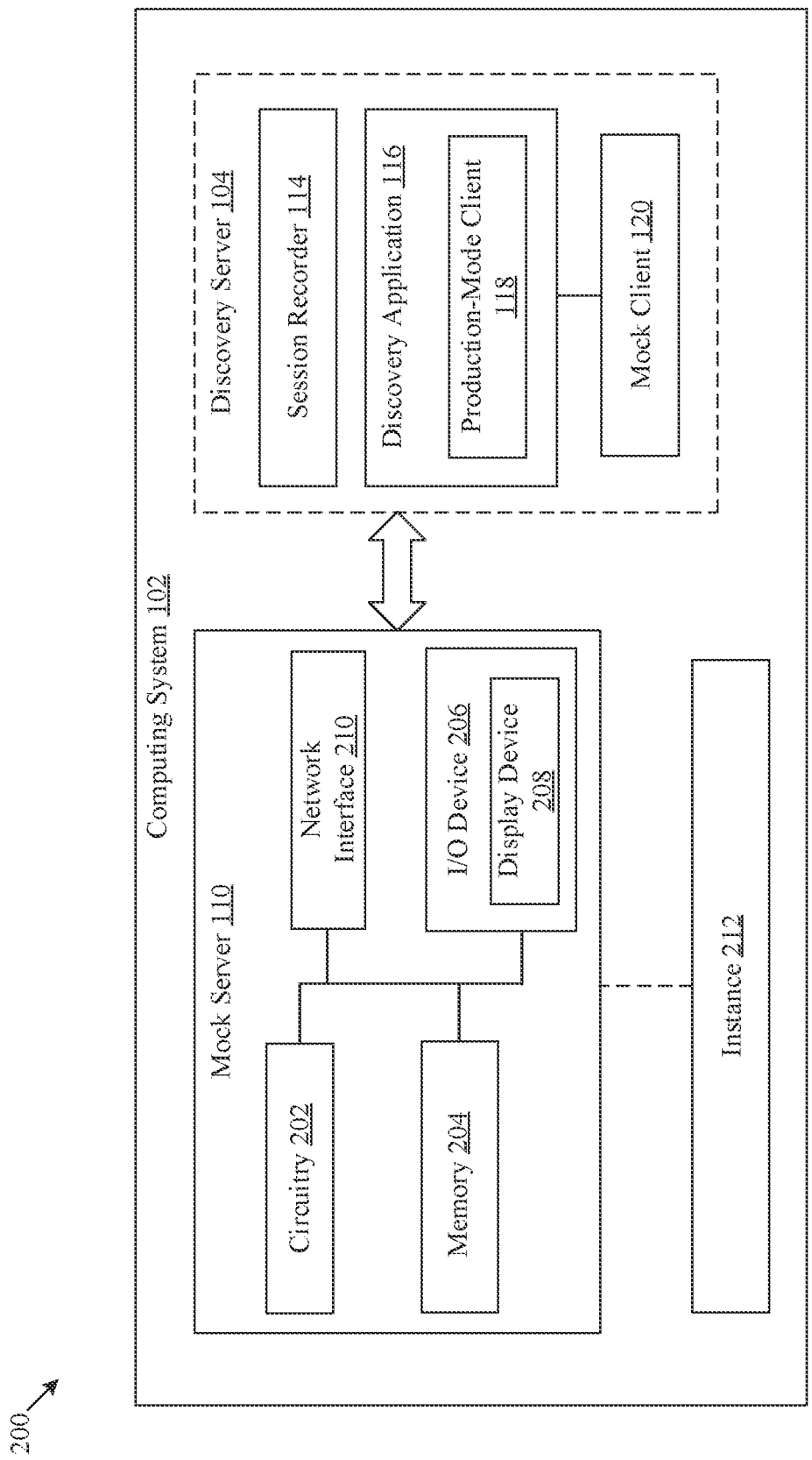
FIG. 2 is a block diagram of a system for implementing a mock server for discovery of resources on a remote computing system, in accordance with an embodiment of the disclosure.

FIG. 2 is a block diagram of a system for implementing a mock server for discovery of resources on a remote computing system, in accordance with an embodiment of the disclosure. FIG. 2 is explained in conjunction with elements from FIG. 1. With reference to FIG. 2, there is shown a block diagram 200 of the computing system 102. The computing system 102 may include the mock server 110 and the database 112 coupled to the mock server 110. The computing system 102 may also include an instance 212 on which the mock server 110 may be deployed. In some embodiments, the computing system 102 may also include the discovery server 104. The discovery server 104 may include the session recorder 114, the discovery application 116, and the mock client 120 of the discovery application 116 to communicate with the mock server 110. The discovery application 116 may also include the production-mode client 118, which may be activated for use by the discovery application when the discovery server is configured for a production-mode (i.e. a mode in which the production mode client communicates with a real server (such as the remote computing system) for discovery of resources on the real server.

The mock server 110 may include circuitry 202, a memory 204, an input/output (I/O) device 206, a display device 208, and a network interface 210. In an embodiment, the instance 212 may host and execute the mock server 110. In some embodiments, the database 112 may be separate from the mock server 110 and may communicate the mock server 110 via the network interface 210. In some other embodiments, the memory 204 may include the database 112.

The circuitry 202 may be configured to communicate with the discovery server 104 and the database 112 by use of the network interface 210. The circuitry 202 may include suitable logic, circuitry, interfaces, and/or code that may be configured to execute instructions for operations to be executed by the mock server 110. Examples of implementation of the circuitry 202 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 204 may include suitable logic, circuitry, code, and/or interfaces that may be configured to store the instructions executable by the circuitry 202. The memory 204 may also store the received client request, the hash key included the received client request, and the first response determined from the mock response dataset. In some embodiments, the memory 204 may store the mock response dataset. In such case, the database 112 may be implemented within the memory 204. Examples of implementation of the memory 204 may include, but are not limited to, Random Access Memory (RAM), Read Only Memory (ROM), Hard Disk Drive (HDD), and/or a Secure Digital (SD) card.

The I/O device 206 may include suitable logic, circuitry, and/or interfaces that may be configured to receive an input and provide an output based on the received input. The I/O device 206 may include various input and output devices, which may be configured to communicate with the circuitry 202. Examples of the I/O device 206 may include, but are not limited to, a touch screen, a keyboard, a mouse, a joystick, a display device (e.g., the display device 208), a microphone, or a speaker.

The display device 208 may include suitable logic, circuitry, and interfaces that may be configured to display output associated with the mock server 110. The display device 208 may be a touch screen which may enable a user of the mock server 110 to provide a user-input via the display device 208. The display device 208 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208 may refer to a display screen of a head mounted device (HMD), a smart-glass device, a see-through display, a projection-based display, an electro-chromic display, or a transparent display.

The network interface 210 may include suitable logic, circuitry, interfaces, and/or code that may be configured to enable communication between the mock server 110, the database 112, and the discovery server 104, via one or more communication networks. The network interface 210 may implement known technologies to support wired or wireless communication with the one or more communication networks.

The network interface 210 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The instance 212 may include suitable logic, interfaces, and/or code that may be configured to host the mock server 110. In an embodiment, the instance 212 may execute a scriptable Representational State Transfer (REST) Application Programming Interface (API) to enable the mock server 110 to respond to the client request from the mock client 120. Examples of the instance 212 may include a JavaScript-based instance, a Python-based instance, an Active Server Page (ASP)-based instance, a Java Server Page (JSP)-based instance, a Hypertext Preprocessor (PHP)-based instance, a Tool Command Language (TCL)-based instance, or a Glide.js JavaScript-based instance.

Similar to the mock server 110, each of the discovery server 104 and the user device 108 (though not shown in FIG. 2) may include one or more components including, but not limited to, circuitry, a memory, a I/O device, a display device, and a network interface with similar functions. The functions or operations executed by the mock server 110, as described in FIGS. 1, 3, 4, 5, 6, and 7, may be performed by the circuitry 202. Operations executed by the circuitry 202 are described in detail, for example, in FIGS. 1, 3, 4, 5, 6, and 7.

Figure 3:
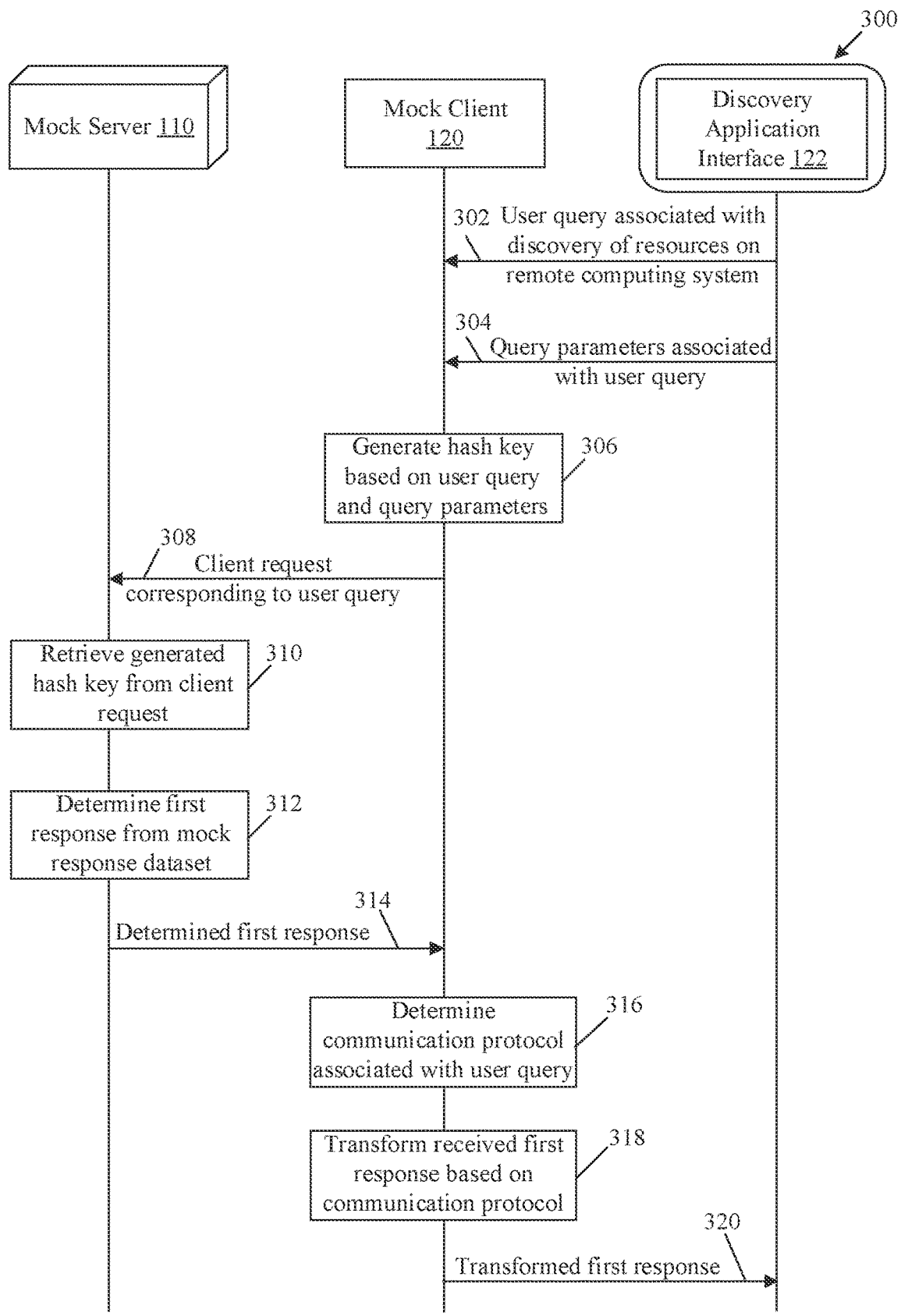
FIG. 3 is a sequence diagram that illustrates exemplary operations associated with an implementation of a mock server for discovery applications, in accordance with an embodiment of the disclosure.

FIG. 3 is a sequence diagram that illustrates exemplary operations associated with an implementation of a mock server for discovery applications, in accordance with an embodiment of the disclosure. FIG. 3 is explained in conjunction with elements from FIGS. 1 and 2. With reference to FIG. 3, there is shown a sequence diagram 300 that illustrates a sequence of operations from 302 to 320. The sequence of operations may be executed by various components of the network environment 100 of FIG. 1.

At 302, a user query associated with a discovery of resources on the remote computing system 106 may be transmitted to the mock client 120. In an embodiment, the discovery application interface 122 on the user device 108 may transmit the user query to the mock client 120 based on a user input from the user 124 associated with the user device 108. The user input may include, for example, query parameters, a query Uniform Resource Locator (i.e. a query URL), and an instruction (e.g., a submission of the user input) to discover the resources on the remote computing system 106. The user query may include, for example, a query URL of the remote computing system 106 or an IP address associated with the remote computing system 106.

At 304, query parameters associated with the user query may be transmitted to the mock client 120. In an embodiment, the discovery application interface 122 on the user device 108 may transmit the query parameters to the mock client 120. For example, the query parameters may include a user name or an account identifier (ID) associated with a service account of the discovery application 116, a domain name or ID, an IP address of a host where the discovery application 116 is run, a discovery protocol (i.e., a communication protocol) to be used for communication, a username and/or a password associated with a user account on the remote computing system 106, or an authentication token associated with the remote computing system 106. Examples of the discovery protocol may include, but are not limited to, a Representational State Transfer (REST) protocol, a Windows Management Instrumentation (WMI) protocol, a Secure Shell (SSH) protocol, or a Simple Network Management Protocol (SNMP) protocol.

The query parameters may be required to connect and communicate with the remote computing system 106 and authorize the discovery application 116 on the discovery server 104 to execute a set of operations (i.e. a discovery pattern) for the discovery of the resources on the remote computing system 106.

At 306, a hash key may be generated based on the user query and the query parameters. In an embodiment, the mock client 120 may generate the hash key based on the user query and the query parameters. By way of example, and not limitation, in case of cloud key generation, the user query may include a URL of a Storage Service (S3) storage infrastructure of a Web Service (WS) cloud (i.e. the remote computing system 106) and an instruction to discover all S3 buckets associated with the WS cloud. The URL may be "https://s3.us-east1.wsapi.a1.com" and the query parameters may include the account ID for a cloud service account as "123455". In such a case, the mock client 120 may generate the hash key from <Service Account ID>_<User Query URL>_<User Query method>_<User Query body>. By way of another example, and not limitation, in case the communication protocol is a Secure Shell (SSH) protocol, the user query may include a query URL such as "./ls" command to list all resources (e.g., files/folders) and the query parameters may include a host address (e.g., an IP address "192.168.21.21") associated with the remote computing system 106, and the discovery protocol as SSH. The query parameters may further include a username and/or a password. The mock client 120 may generate the hash key from <host address>_<query URL>_<username>.

At 308, a client request may be transmitted to the mock server 110. In an embodiment, the mock client 120 may transmit the client request to the mock server 110. The client request may correspond to the user query and may include the generated hash key. In an embodiment, the client request may be a REST call to the mock server 110. In such a case, the generated hash key may be encapsulated in a message format which is compatible with that of the mock server 110. Examples of such a format may include, but are not limited to, a hypertext transmission protocol (HTTP) format, a secure-HTTP (HTTPS) format, an eXtensible Markup Language (XML) format, a comma separated values (CSV) format, or a JavaScript Object Notation (JSON) format.

At 310, the hash key may be retrieved from the client request. In an embodiment, the mock server 110 may receive the client request and may retrieve the hash key from the received client request.

At 312, a first response may be determined from the mock response dataset based on the retrieved hash key. In an embodiment, the mock server 110 may determine the first response to the user query from the mock response dataset (stored on the database 112). The mock response dataset may include a set of responses associated with a sequence of operations executed in the past for the discovery of the resources on the remote computing system 106. In an embodiment, the mock response dataset may include a set of records, each of which may include a request associated with one of the sequence of operations and a response which may be paired with the request. Each record may further include a hash key that may uniquely identify the request and the response of that record. An example of a record of the mock response dataset is provided in Table 1, as follows:

TABLE 1

An exemplary record of the mock response dataset

| Hash Key | Request | Response |
| --- | --- | --- |
| 1242542345 | {<br>"url":"https://s3.a1/action=describe",<br>"body":"..."<br>} | {<br>"status":200,<br>"header":"context:2",<br>"body":"..."<br>} |

Data provided in Table 1 should merely be taken as experimental data and should not be construed as limiting for the present disclosure. In the past when a discovery pattern (i.e. the sequence of operations) is run in the production-mode using the production-mode client 118 (while the mock client 120 is inactive), the session recorder 114 may record session data associated with the sequence of operations (i.e. the discovery pattern). Such session data may include, for example, a sequence of REST calls as requests to the remote computing system 106 and a sequence of REST responses of the remote computing system 106 to the sequence of REST calls. In some embodiments, the session data may also include an HTML markup and pagination data for each of the sequence of responses. Based on the recorded session data, the session recorder 114 may populate the mock response dataset. Recording of the session data and the population of the mock response dataset are described further, for example, in FIG. 5.

In an embodiment, the mock server 110 may extract a record from the mock response dataset by comparison of the hash key in the client request with the hash key in the mock response dataset. The mock server 110 may determine the first response (i.e. also referred to as a mock response) as a response included in the extracted record of the mock response dataset.

At 314, the determined first response may be transmitted to the mock client 120. In an embodiment, the mock server 110 may transmit the determined first response to the mock client 120. In an embodiment, the mock server 110 may utilize RESTful services of the instance 212 to transmit the first response as a REST response to the mock client 120.

At 316, a communication protocol associated with the user query may be determined by the mock client 120. In an embodiment, the mock client 120 may determine the communication protocol associated with the user query (transmitted to the mock client 120 at 302). For example, the mock client 120 may determine the communication protocol by inspection of the query parameters associated with the user query.

At 318, the received first response may be transformed based on the determined communication protocol. In an embodiment, the mock client 120 may transform the first response received from the mock server 110 based on the determined communication protocol. As an example, if the determined communication protocol is SSH and if the first response is a REST response in a first format (as received from the mock server 110), then the first response may be transformed to a format compatible with SSH. As another example, if the determined communication protocol is WMI or SNMP and if the first response is a REST response in a first format (as received from the mock server 110), then the first response may be transformed to a format compatible with WMI or SNMP. This may be performed to ensure that that the transformed response complies with the communication protocol specified through the user query and/or the query parameters associated with the user query. As the mock client 120 may transform the first response to a format associated with the determined communication protocol, it may not matter if responses in the mock response dataset are recorded in a format associated with a different communication protocol.

At 320, the transformed first response may be sent to the user device 108. In an embodiment, the mock client 120 may send the transformed first response to the discovery application interface 122 on the user device 108. The discovery application interface 122 may receive the first response and may extract a result of the user query and markup/context information (such as pagination, header information, or a presentation style) associated with the extracted result. Thereafter, the discovery application interface 122 may display the extracted result based on the markup/context information.

It should be noted that operations from 302 to 320 describe a single request-response operation of the discovery pattern. In the execution of the discovery pattern, operations from 302 to 320 may be iteratively executed to transmit several other client requests to the mock server 110 and receive several responses (mock responses) to such client requests from the mock server 110.

Figure 4:
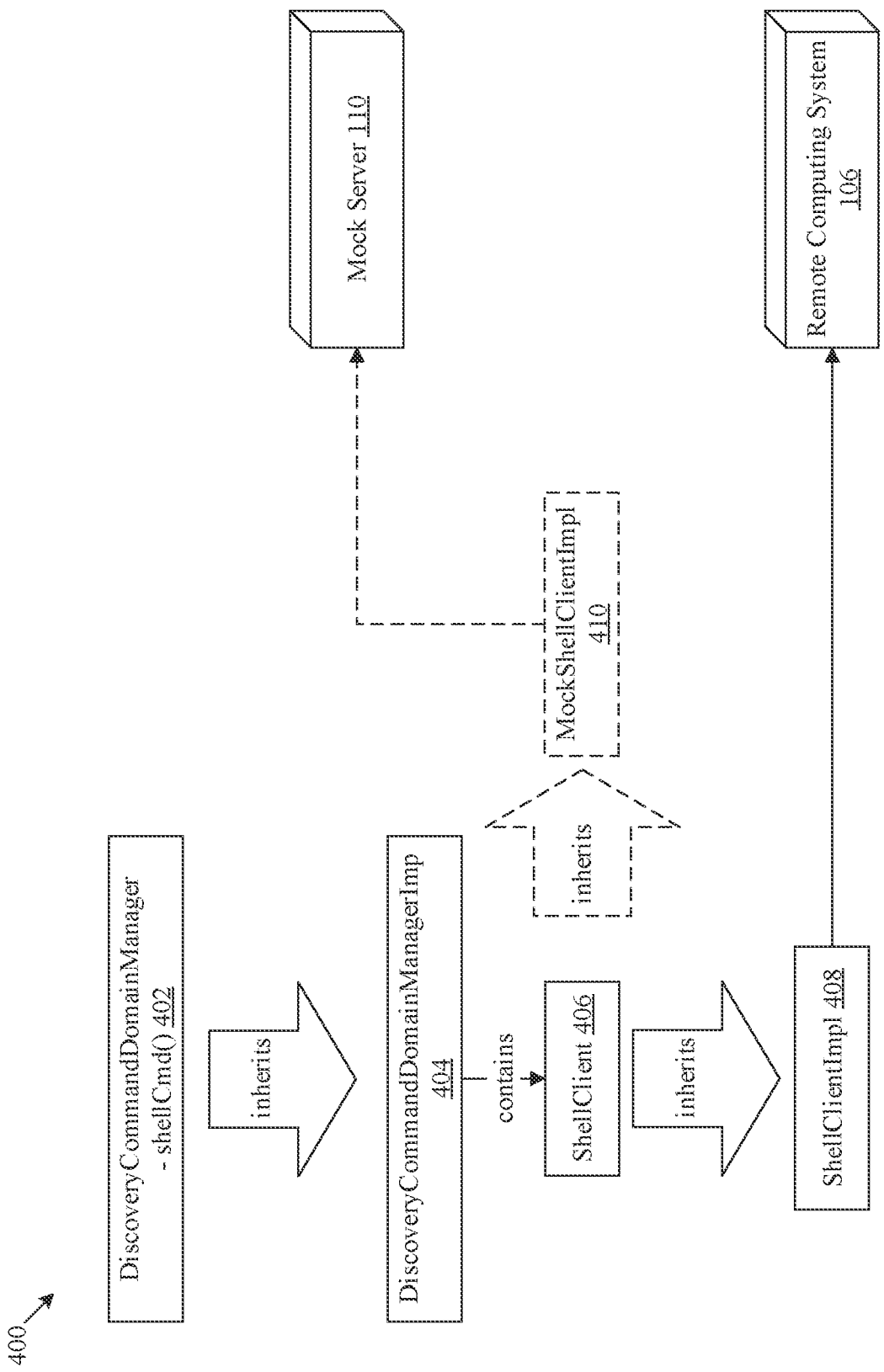
FIG. 4 is a diagram that illustrates an exemplary scenario of activation of a mock client on a discovery server, in accordance with an embodiment of the disclosure.

FIG. 4 is a diagram that illustrates an exemplary scenario of activation of a mock client on a discovery server, in accordance with an embodiment of the disclosure. FIG. 4 is explained in conjunction with elements from FIG. 1, FIG. 2, and FIG. 3. With reference to FIG. 4, there is shown an exemplary scenario 400 of activation of the mock client 120 on the discovery server 104. In the exemplary scenario 400, there is shown a shellCmd( ) function 402 of DiscoveryCommandDomainManager class, a DiscoveryCommandDomainManagerImp class 404, a ShellClient 406, a ShellClientImpl 408, and a MockShellClientImpl 410. There is further shown the remote computing system 106 (i.e. an exemplary implementation of a real server), and the mock server 110. The ShellClientImpl 408 and the Mock- ShellClientImpl 410 are representations of classes for the production-mode and the mock mode, respectively.

The shellCmd( ) function 402 of the DiscoveryCommandDomainManager class may inherit from the DiscoveryCommandDomainManagerImp class 404. The DiscoveryCommandDomainManagerImp class 404 may contain the ShellClient 406. The discovery server 104 may use the shellCmd( ) function 402 of the class DiscoveryCommandDomainManager for the discovery of the resources on the remote computing system 106. The ShellClient 406 may be used to instantiate a class object to activate one of: the production-mode client 118 or the mock client 120.

In the production-mode, the ShellClient 406 may inherit from the ShellClientImpl 408 to activate the production-mode client 118 on the discovery server 104. The production-mode client 118 may use the ShellClient 406, including functions from the ShellClientImpl 408 to communicate with the remote computing system 106 (i.e. the real server). Based on receipt of a user query, the production-mode client 118 may be responsible for sending API calls or REST calls to the remote computing system 106 (i.e. the real server) to discover the resources on the remote computing system 106. The remote computing system 106 may respond to the API calls or the REST calls by sending responses to the production-mode client 118. The production-mode client 118 may transmit the provided responses to the discovery application interface 122 as a result of the discovery of the resources on the remote computing system 106.

In the production mode, the production-mode client 118 on the discovery server 104 may use its own production-mode class (i.e. represented by the ShellClientImpl 408) to talk to the remote computing system 106 (i.e. the real server). In order to activate the mock mode, there is a need to switch from the production-mode client 118 to the mock client 120. The mock client 120 may be configured to talk to the mock server 110 (and not the real server) using its own mock class (i.e. represented by the MockShellClientImpl 410). By updating class properties or attributes on the discovery server 104, dependency of the mock class may be injected to make sure the ShellClient 406 inherits the mock class (i.e. represented by the MockShellClientImpl 410). For switching back to the production-mode client 118, dependency of the production mode class may be injected by updating the class properties on the discovery server 104. The mock client 120 or the production-mode client 118 may be loaded based on the class properties of the discovery server 104.

In the test mode (also referred to as the mock mode), the ShellClient 406 may inherit from the MockShellClientImpl 410 to activate the mock client 120 on the discovery server 104. The mock client 120 may use the ShellClient 406, including functions from the MockShellClientImpl 410 to transmit client requests to the mock server 110. The mock server 110 may receive client requests corresponding to user queries received from the user device 108. The mock server 110 may respond to the client requests by extracting responses (e.g., RESTful responses) from the mock response dataset. Thus, the mock server 110 may emulate a response-mechanism of a real server such that it may not be possible to determine if the responses received by the user device 108 are from the real server or the mock server 110.

In an embodiment, the discovery server 104 may maintain one or more flags to indicate a current mode of operation (e.g., the production-mode or the mock mode) of the discovery server 104 and also to switch between the modes of operation. Based on a user input via the discovery application interface 122, the discovery server 104 may switch between the two modes of operation.

It should be noted that the exemplary scenario 400 of FIG. 4 is presented merely as an example and should not be construed as limiting the scope of the disclosure. The use of dependency injection for the activation of the mock client 120 is explained further, for example, in FIG. 5.

Figure 5:
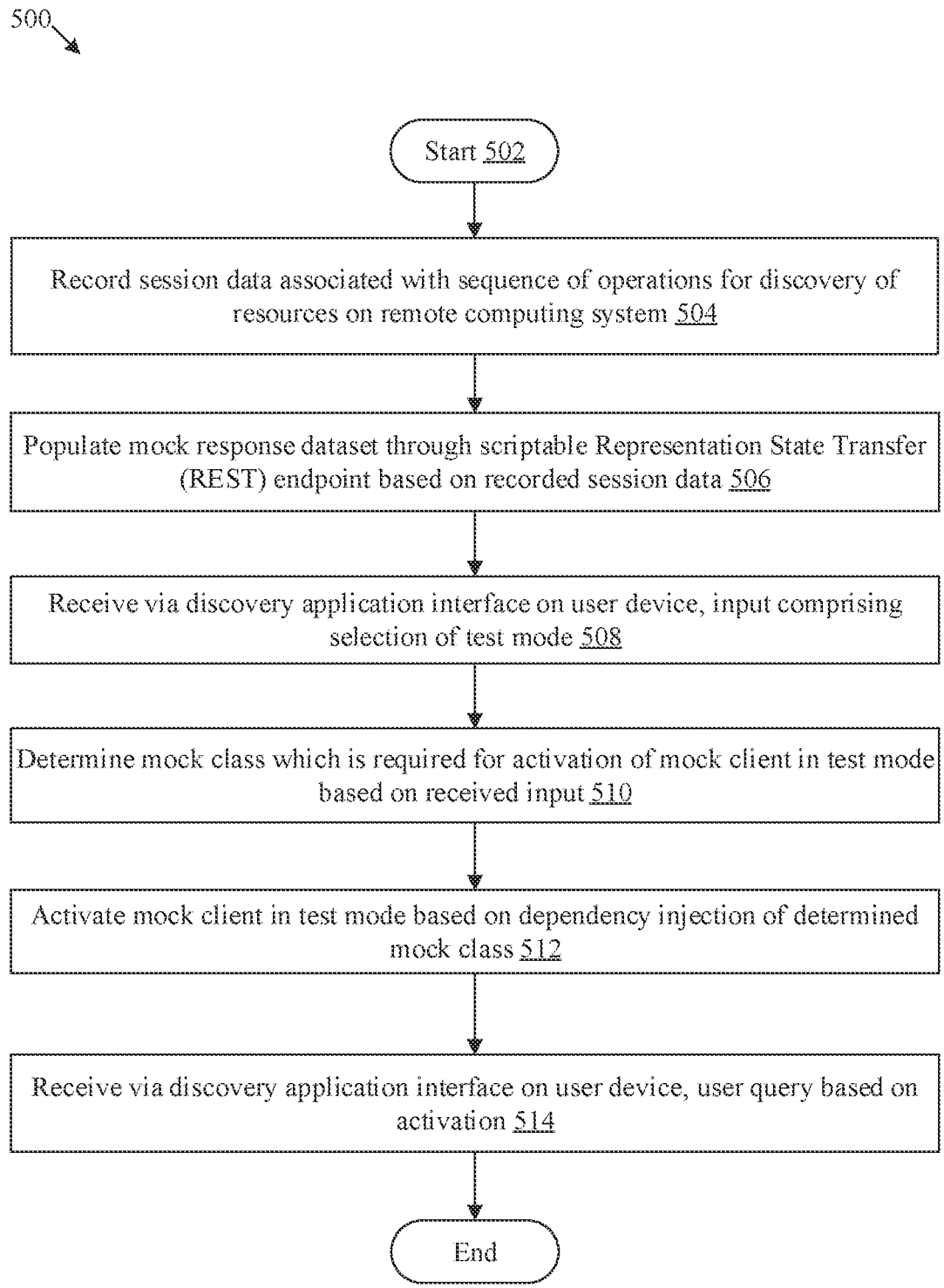
FIG. 5 is a flowchart that illustrates an exemplary method for generation of a mock response dataset and activation of a mock client, in accordance with an embodiment of the disclosure.

FIG. 5 is a flowchart that illustrates an exemplary method for generation of a mock response dataset and activation of a mock client, in accordance with an embodiment of the disclosure. FIG. 5 is described in conjunction with elements from FIGS. 1, 2, 3, and 4. With reference to FIG. 5, there is shown a flowchart 500. The exemplary method of the flowchart 500 may be executed on any computing system, for example, on the discovery server 104 of FIG. 1. The exemplary method of the flowchart 500 may start at 502 and may proceed to 504.

At 504, session data associated with a sequence of operations (of a discovery pattern) may be recorded on the discovery server 104. In an embodiment, the session recorder 114 may record the session data on the discovery server 104. For example, in the production-mode, the production-mode client 118 may send a sequence of requests (e.g., REST calls) through a suitable communication protocol to the remote computing system 106. Each of the sequence of requests may include a query URL (or an IP address) and query parameters to retrieve information associated a particular resource on the remote computing system 106.

For example, if the communication protocol is SSH, the request may include an SSH query (such as "./ls") to a host address (or URL) associated with the remote computing system 106. The request may also include certain query parameters, such as a username registered with the remote computing system 106 and the host address (such as 192.168.21.21). The remote computing system 106 may receive the request and may transmit a response to the discovery server 104. The response may include the information associated with the particular resource (as specified in the SSH query) on the remote computing system 106. While the request is transmitted and the response to the transmitted request is received on the discovery server 104, the session recorder 114 may intercept and record both the request and the response as a session record in the session data.

At 506, the mock response dataset may be populated based on the recorded session data. In an embodiment, the session recorder 114 may populate the mock response dataset through the scriptable REST endpoint based on the recorded session data. Through the scriptable REST endpoint, the session recorder 114 may update fields, such as a hash key, a request, and a response of the mock response dataset. The populated mock response dataset may be stored on the instance 212, on which the mock server 110 is deployed. When the mock response dataset is populated, the session recorder 114 may generate a hash key for each pair of request and response in the mock response dataset. The generation of the hash key may be similar to that described, for example, in FIG. 3 (at 306). For the sequence of operations, the mock response dataset may include a set of records, each of which may include a request (associated with one of the sequence of operations) with request parameters, a response which is paired with the request, and a hash key which may uniquely identify the request and the response. While response data in the mock response dataset may be used to determine a mock response of the mock server (in mock/test mode), request data in the mock response dataset may be used for debugging applications (such debugging of a discovery pattern in test/mock mode). An example record of the mock response dataset is shown in Table 1 of FIG. 3.

At 508, an input including a selection of a test mode (or a mock mode) may be received via the discovery application interface 122 on the user device 108. In an embodiment, the discovery server 104 may receive the input via the discovery application interface 122 on the user device 108.

At 510, a mock class may be determined for activation of the mock client 120 in the test mode (or the mock mode) based on the received input. In an embodiment, the discovery server 104 may determine the mock class that may be required for the activation of the mock client 120 in the test mode. For example, the mock class in FIG. 4 is represented by the MockShellClientImpl 410.

At 512, the mock client 120 may be activated in the test mode based on a dependency injection of the determined mock class. In an embodiment, the discovery server 104 may activate the mock client 120 in the test mode. By way of example, and not limitation, the discovery server 104 may inject a dependency of the mock class (represented by the MockShellClientImpl 410) into a shell client class (represented by the ShellClient 406) of the discovery application 116 such that the shell client class inherits the mock class instead of a production-mode class (i.e. represented by the ShellClientImpl 408).

In some embodiments, the discovery server 104 may generate the mock class based on the class properties (also referred to as Management, Instrumentation, and Discovery (MID) properties) of the discovery server 104 at run-time. The activated mock client 120 may use the mock class and an interface (which may be same as that of the production-mode client 118) to call the mock server 110. In these or other embodiments, the discovery server 104 may define a flag in properties of the discovery server 104 to switch between the production mode and the test mode (or the mock mode).

At 514, a user query may be received by the mock client 120 via the discovery application interface 122 on the user device 108. In an embodiment, the mock client 120 may receive the user query (and query parameters associated with the user query) based on the activation of the mock client 120 (in the test mode). Subsequent operations associated with implementation of the mock server 110 for the user query and the query parameters are explained, for example, from 302 to 320 of FIG. 3. Control may pass to end.

Although the flowchart 500 is illustrated as discrete operations, such as 504, 506, 508, 510, 512, and 514, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 6:
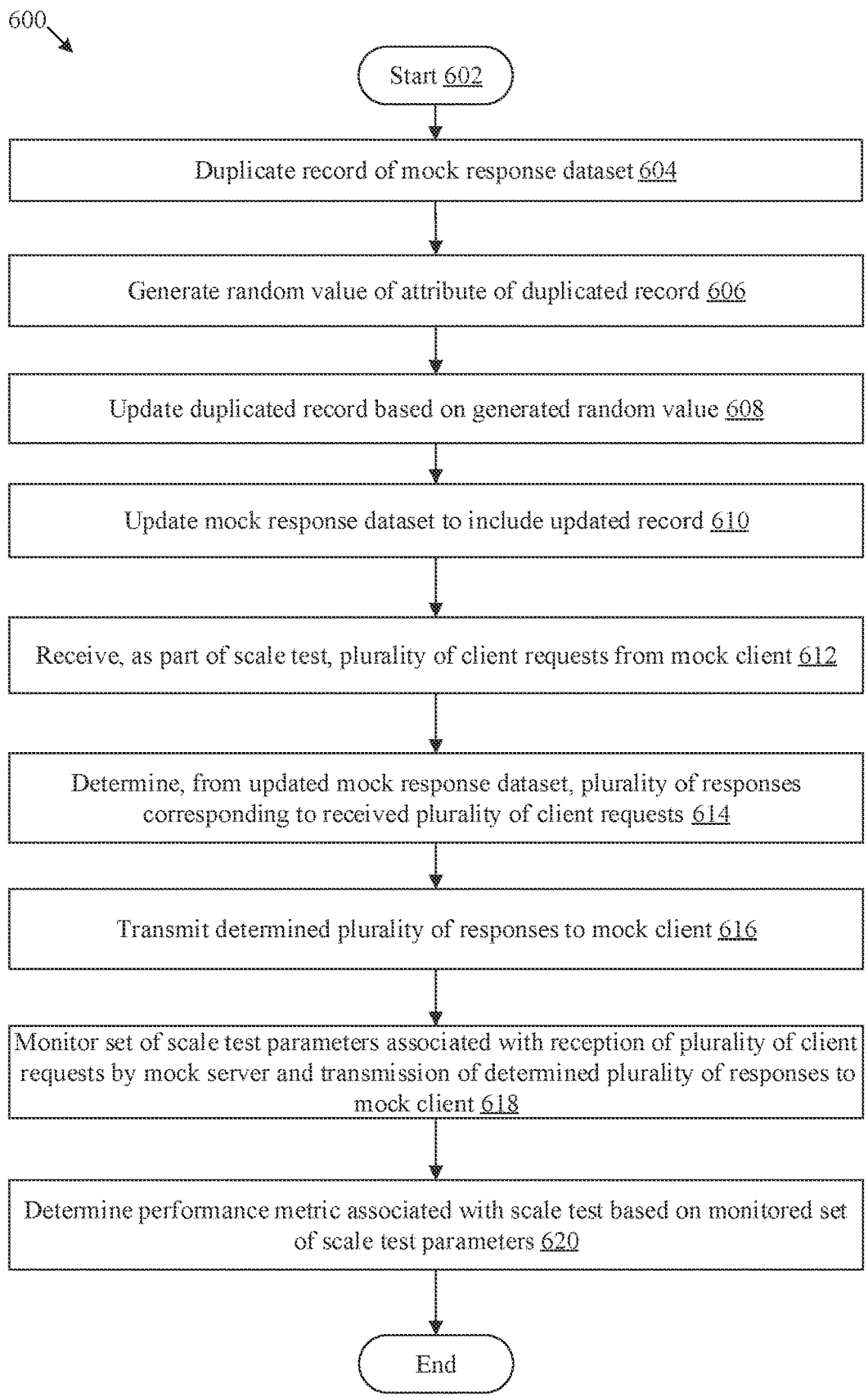
FIG. 6 is a flowchart that illustrates an exemplary method for implementing a scale test, in accordance with an embodiment of the disclosure.

FIG. 6 is a flowchart that illustrates an exemplary method for implementing a scale test, in accordance with an embodiment of the disclosure. FIG. 6 is described in conjunction with elements from FIGS. 1, 2, 3, 4, and 5. With reference to FIG. 6, there is shown a flowchart 600. The exemplary method of the flowchart 600 may be executed by any computing system, for example, by the mock server 110 and the discovery server 104 of FIG. 1. The exemplary method of the flowchart 600 may start at 602 and proceed to 604.

At 604, a record of the mock response dataset may be duplicated. In an embodiment, the mock server 110 may duplicate a record of the mock response dataset. The duplication may create a new record which may include data of the record which is duplicated. Such data may include a hash key, a request, and a response. For example, the response may include several attributes, such as a status and a header.

At 606, a random value of an attribute of the duplicated record may be generated. In an embodiment, the mock server 110 may generate the random value of the attribute. For example, a random value of a status attribute of Table 1 may be generated as 404.

At 608, the duplicated record may be updated based on the generated random value. In an embodiment, the mock server 110 may update the duplicate record based on the generated random value. For example, the status attribute in Table 1 may be assigned the generated random value of 404 (which may replace an initial value (200) of the status attribute.

At 610, the mock response dataset may be updated to include the updated record. In an embodiment, the mock server 110 may update the mock response dataset to include the updated duplicate record. The foregoing operations from 604 to 610 may be repeated to obtain a mock response dataset which includes several new records (with randomization of certain attribute values).

At 612, a plurality of client requests may be received from the mock client 120. In an embodiment, the mock server 110 may receive the plurality of client requests as part of a scale test. The scale test may evaluate a request and response handling capacity of both the mock server 110 and the mock client 120. The scale test may be helpful for developers and users of the discovery application 116 and administrators of the remote computing system 106 to evaluate a performance of the discovery application 116 and/or the remote computing system 106 when placed under an increased volume of client requests.

At 614, a plurality of responses corresponding to the received plurality of client requests may be determined from the updated mock response dataset. In an embodiment, the mock server 110 may determine the plurality of responses from the updated mock response dataset. The determination of the plurality of responses may be similar to the determination of the first response, as described, for example, in FIG. 3.

At 616, the determined plurality of responses may be transmitted to the mock client 120. In an embodiment, the mock server 110 may transmit the determined plurality of responses to the mock client 120.

At 618, a set of scale test parameters may be monitored. The set of scale test parameters may be associated with the reception of the plurality of client requests by the mock server 110 and the transmission of the determined plurality of responses to the mock client 120. In an embodiment, the discovery server 104 may monitor the set of scale test parameters. Examples of a scale test parameter may include, but are not limited to, a response time associated with the transmission of the plurality of responses, and a throughput associated with a number of the plurality of client requests processed in a given time. Other examples of the scale test parameter may include a processor usage associated with the mock server 110 to respond to the plurality of client requests, a memory usage associated with the mock server 110 to respond to the plurality of client requests, and a network usage associated with the reception of the plurality of client requests and transmission of the plurality of responses.

At 620, a performance metric associated with the scale test may be determined based on the monitored set of scale test parameters. In an embodiment, the discovery server 104 may determine the performance metric associated with the scale test. As an example, the discovery server 104 may normalize the values of each of the monitored set of scale test parameters and may then determine a weighted average of the normalized values of the set of scale test parameters to ascertain a score. The score may be a real number between 0 to 1 and may indicate the performance (i.e., the scale test result) associated the discovery application and the mock server. Control may pass to end.

Although the flowchart 600 is illustrated as discrete operations, such as 604, 606, 608, 610, 612, 614, 616, 618, and 620, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 7:
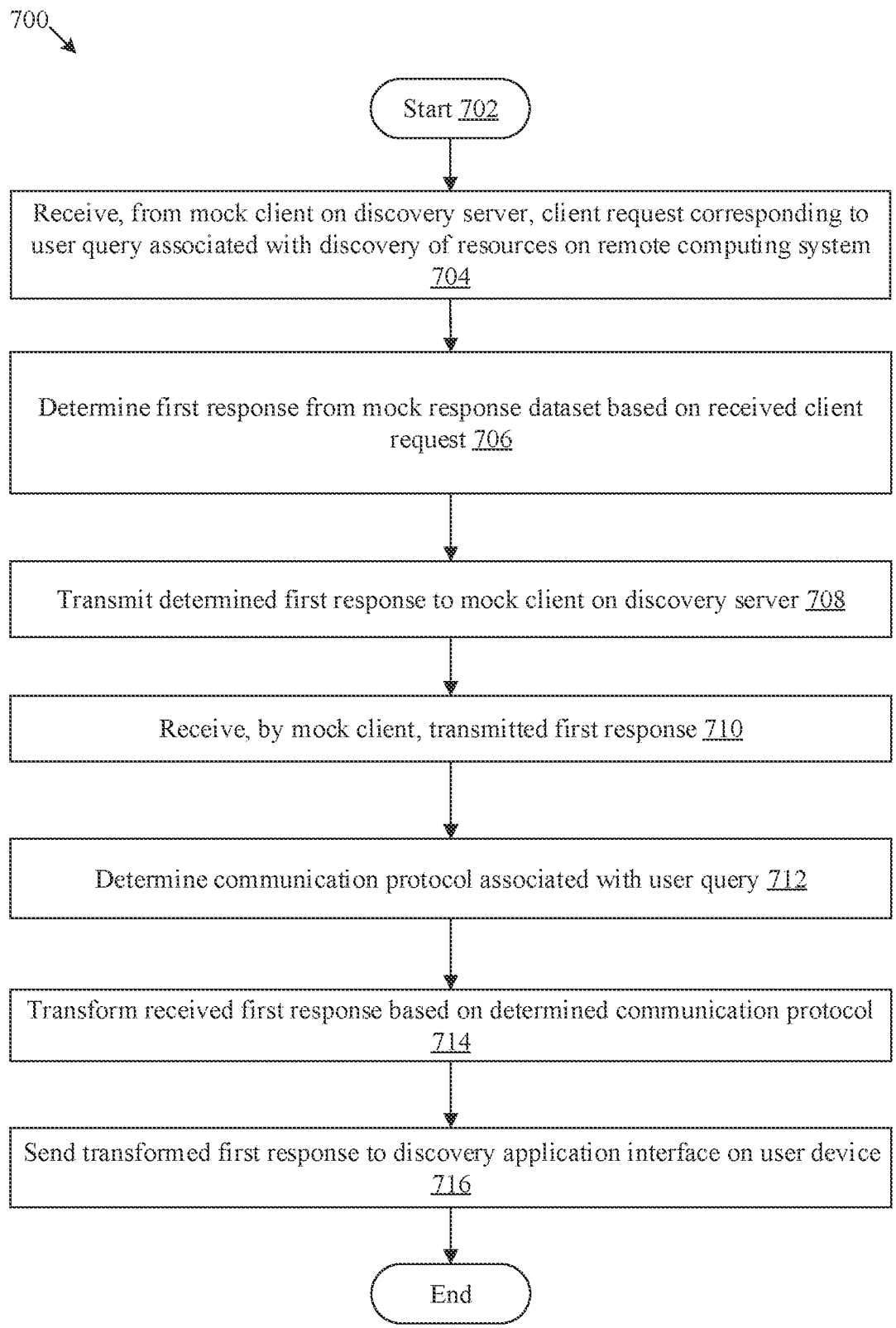
FIG. 7 is a flowchart that illustrates an exemplary method for implementing a mock server for discovery applications, in accordance with an embodiment of the disclosure.

FIG. 7 is a flowchart that illustrates an exemplary method for implementing a mock server for discovery applications, in accordance with an embodiment of the disclosure. FIG. 7 is described in conjunction with elements from FIGS. 1, 2, 3, 4, 5, and 6. With reference to FIG. 7, there is shown a flowchart 700. The exemplary method of the flowchart 700 may be executed by any computing system, for example, by the mock server 110 and the mock client 120 of FIG. 1. The exemplary method of the flowchart 700 may start at 702 and proceed to 704.

At 704, a client request may be received from the mock client 120 on the discovery server 104. In an embodiment, the mock server 110 may receive the client request from the mock client 120. The client request may correspond to the user query associated with the discovery of resources on the remote computing system 106.

The mock client 120 may receive the user query and query parameters associated with the user query from the discovery application interface 122. The client request may include information, which may be obtained from the user query and the query parameters. For example, the mock client 120 may generate a hash key based on the user query and the query parameters. Further, the mock client 120 may include the generated hash key in the client request. Details associated with the reception of the client request are provided, for example, in FIG. 3.

At 706, a first response may be determined from the mock response dataset based on the received client request. In an embodiment, the mock server 110 may determine the first response from the mock response dataset (stored on the instance 212). The mock response dataset may include a set of responses associated with a sequence of operations executed in the past for the discovery of resources on the remote computing system 106. The determination of the first response is described further, for example, in FIG. 3.

At 708, the determined first response may be transmitted to the mock client 120 on the discovery server 104. In an embodiment, the mock server 110 may transmit the determined first response to the mock client 120. The mock server 110 may respond to the client request with the first response, through a scriptable REST API, which may be implemented on the instance 212 (on which the mock server 110 is hosted).

At 710, the transmitted first response may be received. In an embodiment, the mock client 120 may receive the transmitted first response from the mock server 110.

At 712, a communication protocol associated with the user query may be determined. In an embodiment, the mock client 120 may determine the communication protocol associated with the user query. The determination of the communication protocol associated with the user query is described further, for example, in FIG. 3.

At 714, the received first response may be transformed based on the determined communication protocol. In an embodiment, the mock client 120 may transform the received first response to a format compatible with the determined communication protocol. The transformation of the received first response is described further, for example, in FIG. 3.

At 716, the transformed first response may be sent to the discovery application interface 122 on the user device 108. In an embodiment, the mock client 120 may send the transformed first response to the discovery application interface 122 on the user device 108. The discovery application interface 122 may receive the transformed first response and may display a result of the user query on the user device 108 based on the transformed first response. Control may pass to end.

Although the flowchart 700 is illustrated as discrete operations, such as 704, 706, 708, 710, 712, 714, and 716, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate a computing system (e.g., the computing system 102) for implementing a mock server (such as the mock server 110) for discovery applications. The computer-executable instructions may cause the machine and/or computer to perform operations that include receiving, by the mock server, a client request from a mock client (such as the mock client 120) on a discovery server (such as the discovery server 104). The client request may correspond to a user query associated with a discovery of resources on a remote computing system (such as the remote computing system 106). The operations further include determining, by the mock server, a first response from a mock response dataset. The first response may be determined based on the received client request. The mock response dataset may include a set of responses associated with a sequence of operations executed in the past for the discovery of resources on the remote computing system. The operations further include transmitting the determined first response to the mock client on the discovery server and sending, by the mock client, the received first response to a discovery application interface (such as the discovery application interface 122) on a user device (such as the user device 108).

Exemplary aspects of the disclosure may include a system (such as, the computing system 102) that may include a mock server (such as, the mock server 110). The mock server 110 may be configured to receive a client request from a mock client (such as, the mock client 120) on a discovery server (such as, the discovery server 104). The client request may correspond to a user query associated with a discovery of resources on a remote computing system (such as, the remote computing system 106). The mock server 110 may be further configured to determine a first response from a mock response dataset based on the received client request. The mock response dataset may include a set of responses associated with a sequence of operations executed in the past for the discovery of resources on the remote computing system 106. The mock server 110 may be further configured to transmit the determined first response to the mock client 120 on the discovery server 104. The mock client 120 may be configured to receive the transmitted first response and send the received first response to a discovery application interface (such as, the discovery application interface 122) on a user device (such as, the user device 108).

In an embodiment, the mock client 120 may be further configured to determine a communication protocol associated with the user query and transform the received first response based on the determined communication protocol. The mock client 120 may then send the transformed first response to the discovery application interface 122 on the user device 108. In an embodiment, the determined communication protocol may be one of, but not limited to, a Representational State Transfer (REST) protocol, a Windows Management Instrumentation (WMI) protocol, a Secure Shell (SSH) protocol, or a Simple Network Management Protocol (SNMP) protocol.

In an embodiment, the discovery server 104 may include a session recorder (such as, the session recorder 114) that may be configured to record session data associated with the sequence of operations for the discovery of resources on the remote computing system 106. The session recorder 114 may be further configured to populate the mock response dataset through a scriptable Representation State Transfer (REST) endpoint based on the recorded session data. In an embodiment, the mock response dataset may include a set of records, each of which may include a request associated with one of the sequence of operations, a response which may be paired with the request, and a hash key which may uniquely identify the request and the response.

In an embodiment, the mock client 120 may be further configured to receive, via the discovery application interface 122 on the user device 108, the user query and query parameters associated with the user query. Further, the mock client 120 may generate a hash key based on the received user query and the query parameters. In an embodiment, the client request from the mock client may include the generated hash key. Further, the mock server 110 may be further configured to retrieve the generated hash key from the client request. In an embodiment, the first response may be determined further based on the retrieved hash key.

In an embodiment, the discovery server 104 may be further configured to receive, via the discovery application interface 122 on the user device 108, an input including a selection of a test-mode. The discovery server 104 may determine a mock class which may be required for activation of the mock client 120 in the test-mode based on the received input. The discovery server 104 may further activate the mock client 120 in the test-mode based on a dependency injection of the determined mock class. In an embodiment, the mock client 120 may be configured to receive the user query via the discovery application interface 122 on the user device 108 based on the activation.

In an embodiment, the mock server 110 may be configured to execute a scriptable Representational State Transfer (REST) Application Programming Interface (API) to respond to the client request received from the mock client.

In an embodiment, the mock server 110 may be further configured to duplicate a record of the mock response dataset, generate a random value of an attribute of the duplicated record, update the duplicated record based on the generated random value; and update the mock response dataset to include the updated record. In an embodiment, the mock server 110 may be further configured to receive, as part of a scale test, a plurality of client requests from the mock client 120 and determine, from the updated mock response dataset, a plurality of responses corresponding to the received plurality of client requests. The mock server 110 may transmit the determined plurality of responses to the mock client 120. In an embodiment, the discovery server 104 may be configured to monitor a set of scale test parameters associated with the reception of the plurality of client requests by the mock server and the transmission of the determined plurality of responses to the mock client. The discovery server 104 may determine a performance metric associated with the scale test based on the monitored set of scale test parameters.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively, or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures. While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A mock server of a computing system, wherein the computing system includes one or more processors and program instructions stored in memory, and wherein execution of the program instructions by the one or more processors causes the mock server to perform operations comprising:
   receiving, as part of a scale test, a plurality of client requests from a mock client on a discovery server;
   determining, from a mock response dataset, a plurality of responses corresponding to the plurality of client requests; and
   transmitting the plurality of responses to the mock client, wherein the discovery server is configured to: monitor a set of scale test parameters associated with reception of the plurality of client requests by the mock server and transmission of the plurality of responses to the mock client; and
   determine a performance metric associated with the scale test based on the set of scale test parameters, and wherein the set of scale test parameters include one or more of: response times associated with the transmission of the plurality of responses, a throughput associated with a number of the plurality of client requests processed in a given amount of time, a processor usage associated with the mock server to respond to the plurality of client requests, a memory usage associated with the mock server to respond to the plurality of client requests, or a network usage associated with reception of the plurality of client requests and transmission of the plurality of responses.

2. The mock server of claim 1, wherein each record in the mock response dataset includes a respective hash key, a respective client request, and a respective response, and wherein determining the plurality of responses corresponding to the plurality of client requests comprises: identifying a hash key in a client request; looking up, in the mock response dataset, a response associated with the hash key; and based on the response being associated with the hash key, determining that the response corresponds to the client request.

3. The mock server of claim 1, wherein determining the performance metric comprises determining a weighted average of normalized values of the set of scale test parameters.

4. The mock server of claim 1, wherein the mock response dataset was derived from records of requests and responses associated with execution of a sequence of past operations for discovery of resources on the computing system.

5. The mock server of claim 4, wherein a session recorder of the discovery server received the requests and the responses, and created the records therefrom.

6. The mock server of claim 1, wherein the operations further comprise:
   duplicating a record of the mock response dataset to form a duplicated record;
   generating a random value of an attribute of the duplicated record;
   updating the duplicated record based on the random value; and
   updating the mock response dataset to include the duplicated record.

7. The mock server of claim 6, wherein the duplicated record includes a hash key, request, and response of the record.

8. The mock server of claim 7, wherein the request species a URL and a body, and wherein the response specifies a status indicator and a header value.

9. The mock server of claim 7, wherein the attribute is a status indicator or a header value of the response.

10. A computer-implemented method comprising:
receiving, as part of a scale test, a plurality of client requests from a mock client on a discovery server;
determine, from a mock response dataset, a plurality of responses corresponding to the plurality of client requests; and
transmit the plurality of responses to the mock client, wherein the discovery server is configured to: monitor a set of scale test parameters associated with reception of the plurality of client requests by a mock server and transmission of the plurality of responses to the mock client; and
determine a performance metric associated with the scale test based on the set of scale test parameters, and wherein the set of scale test parameters include one or more of: response times associated with the transmission of the plurality of responses, a throughput associated with a number of the plurality of client requests processed in a given amount of time, a processor usage associated with the mock server to respond to the plurality of client requests, a memory usage associated with the mock server to respond to the plurality of client requests, or a network usage associated with reception of the plurality of client requests and transmission of the plurality of responses.

11. The computer-implemented method of claim 10, wherein each record in the mock response dataset includes a respective hash key, and wherein determining the plurality of responses corresponding to the plurality of client requests comprises: identifying a hash key in a client request; looking up, in the mock response dataset, a response associated with the hash key; and based on the response being associated with the hash key, determining that the response corresponds to the client request.

12. The computer-implemented method of claim 10, wherein the mock response dataset was derived from records of requests and responses associated with execution of a sequence of past operations for discovery of resources.

13. The computer-implemented method of claim 12, wherein a session recorder of the discovery server received the requests and the responses, and created the records therefrom.

14. The computer-implemented method of claim 10, further comprising:
duplicating a record of the mock response dataset to form a duplicated record;
generating a random value of an attribute of the duplicated record;
updating the duplicated record based on the random value; and
updating the mock response dataset to include the duplicated record.

15. The computer-implemented method of claim 14, wherein the duplicated record includes a hash key, request, and response of the record.

16. The computer-implemented method of claim 15, wherein the request species a URL and a body, and wherein the response specifies a status indicator and a header value.

17. The computer-implemented method of claim 15, wherein the attribute is a status indicator or a header value of the response.

18. A non-transitory computer-readable medium having stored thereon, computer-executable instructions which, when executed by a computing system, causes the computing system to execute operations, the operations comprising:
receiving, as part of a scale test, a plurality of client requests from a mock client on a discovery server;
determine, from a mock response dataset, a plurality of responses corresponding to the plurality of client requests; and
transmit the plurality of responses to the mock client, wherein the discovery server is configured to: monitor a set of scale test parameters associated with reception of the plurality of client requests by a mock server and transmission of the plurality of responses to the mock client; and
determine a performance metric associated with the scale test based on the set of scale test parameters, and wherein the set of scale test parameters include one or more of: response times associated with the transmission of the plurality of responses, a throughput associated with a number of the plurality of client requests processed in a given amount of time, a processor usage associated with the mock server to respond to the plurality of client requests, a memory usage associated with the mock server to respond to the plurality of client requests, or a network usage associated with reception of the plurality of client requests and transmission of the plurality of responses.

19. A non-transitory computer-readable medium having stored thereon, computer-executable instructions which, when executed by a computing system, causes the computing system to execute operations, the operations comprising:
receiving, as part of a scale test, a plurality of client requests from a mock client on a discovery server;
determine, from a mock response dataset, a plurality of responses corresponding to the plurality of client requests;
transmit the plurality of responses to the mock client, wherein the discovery server is configured to: monitor a set of scale test parameters associated with reception of the plurality of client requests by a mock server and transmission of the plurality of responses to the mock client; and
determine a performance metric associated with the scale test based on the set of scale test parameters; duplicating a record of the mock response dataset to form a duplicated record; generating a random value of an attribute of the duplicated record; updating the duplicated record based on the random value; and updating the mock response dataset to include the duplicated record.

* * * * *